United States Patent [19]

Krein

[11] 4,272,874

[45] Jun. 16, 1981

[54] APPARATUS FOR STUFFING COMPRESSIBLE PRODUCTS INTO FLEXIBLE COVERS

[75] Inventor: Reuben J. Krein, Fort Smith, Ark.

[73] Assignee: Coachmen Industries, Inc., Middlebury, Ind.

[21] Appl. No.: 51,511

[22] Filed: Jun. 25, 1979

Related U.S. Application Data

[63] Continuation-in-part of Ser. No. 846,410, Oct. 28, 1977, abandoned.

[51] Int. Cl.[3] .............................................. B23P 19/02

[52] U.S. Cl. ........................................ 29/235; 29/451; 53/438; 53/529; 53/524; 269/21

[58] Field of Search .................... 29/451, 235; 269/21; 53/434, 438, 524, 529

[56] References Cited

U.S. PATENT DOCUMENTS

| | | | |
|---|---|---|---|
| 1,851,028 | 3/1932 | Worrall | 269/21 X |
| 3,224,106 | 12/1965 | Way | 269/21 |
| 3,840,961 | 10/1974 | Brown | 269/21 X |
| 3,884,061 | 5/1975 | Westby | 269/21 X |
| 3,921,273 | 11/1975 | Kondo et al. | 29/451 X |
| 4,066,249 | 1/1978 | Huber et al. | 269/21 |
| 4,088,312 | 5/1978 | Zebus et al. | 269/21 |

FOREIGN PATENT DOCUMENTS

| | | | |
|---|---|---|---|
| 678465 | 1/1964 | Canada | 269/21 |

*Primary Examiner*—Charlie T. Moon

*Attorney, Agent, or Firm*—Oltsch, Knoblock & Hall

[57] ABSTRACT

A method of stuffing an aerated expanded flexible filler into a snug fitting cover, wherein air is evacuated from the filler while resting upon a support so as to shrink the filler and permit rapid application of the cover thereto. The apparatus includes a cantilevered chambered support with multiple openings in its filler supporting surface and selectively operable means for withdrawing air from the chamber and an air impervious sheet draped over the filler and the support.

9 Claims, 6 Drawing Figures

APPARATUS FOR STUFFING COMPRESSIBLE PRODUCTS INTO FLEXIBLE COVERS

CROSS-REFERENCE TO RELATED APPLICATION

This is a continuation-in-part of application Ser. No. 846,410, filed Oct. 28, 1977, now abandoned.

BACKGROUND OF THE INVENTION

This invention relates to a method of stuffing compressible products into flexible covers and apparatus therefor.

The insertion of a compressible product, such as a cushion or a soft filler for toys and dolls, into a flexible cover within which it is to be expanded so as to be conformed or shaped by the cover with a snug close fit has been a problem which has eluded satisfactory solution for many years. Thus the usual procedure of applying a cover to a cushion or to a soft compressible toy or doll body has been to rely upon the manual dexterity of the operator. However, regardless of the degree of dexterity which an operator can achieve, the operation is time consuming and costly. Also, in the case of large cushions, such as those used in recreational vehicles which commonly have dimensions in the order of a length of six feet, a width of at least twelve inches and a thickness of six inches, considerable strength must be exerted to manually apply the cover, even though the cover is of the type which has an opening at a side and/or end thereof which may be closed by slide fasteners when the cover has been applied in place around the cushion filler.

In cases where the cushion or other compressible filling is an open cell foam, such as polyurethane foam, a part of the problem or difficulty of applying a cover stems from the surface characteristics of the foam which tend to cling to or provide frictional resistance to application of the covers thereto. In other cushions using fillers such as feathers, down and kapok confined within an inner enclosure and to be inserted in an outer or finished enclosure, a similar problem of surface friction occurs during application of the outer cover.

Some efforts to deal with the problem have been made previously. An article in the monthly publication "Bedding" published by the National Association of Bedding Manufacturers in the issue of October, 1970, Volume 98, No. 10, pages 63–69 mentions tests of a method for encasing a filler, but does not disclose the structure or mechanism which was used in the test, and does not teach or suggest the apparatus herein disclosed.

Another example is an apparatus for mechanically squeezing the compressible filler by means of rollers to assist in applying a cover, but this has been found to have certain limitations which have prevented its general adoption and acceptance in industry.

Another example disclosed in U.S. Pat. No. 3,611,524, dated Oct. 12, 1971 involved wrapping a filler within a flexible gas impervious sheet having an opening to receive a vacuum head for evacuating air within the wrapper and the filler while a cover is applied around the sheet and filler, thus using the vacuum head to reduce the dimensions of the sheet-enclosed filler and also as a handle to assist in manipulating the reduced sheet-enclosed filler until the cover is fully applied upon the sheet-enclosed filler, whereupon the vacuum head is withdrawn from the sheet and filler.

Vacuum tables for holding work pieces of various types are shown in U.S. Pat. Nos. 1,851,028; 3,840,961; 3,884,061; 4,066,249 and Canadian Patent No. 678,465 dated Jan. 21, 1964, but none have been cantilevered to permit application of a cover over the table and the article supported thereon, and none teach the use of an air impervious sheet draped over the supported article and exposed apertures of the table to permit withdrawal of air from and collapse of an air pervious filler supported on the table. A hand held type of ring section assembly tool is shown in U.S. Pat. No. 3,224,106, but contains no suggestion that could assist in solving the problem of applying a cover to a collapsible filler.

SUMMARY OF THE INVENTION

It is the primary object of this invention to provide a novel, simple and inexpensive means for accommodating rapid and expeditious application of a close fitting cover to a soft compressible filler.

A further object of the invention is to provide a method of applying a snug fitting cover to a normally expanded filler, including the step of shrinking the filler by withdrawing air therefrom and maintaining the filler in shrunken condition for a period of time sufficient to apply a cover thereover.

A further object is to provide a method of applying a cover to an expanded aerated filler including the steps of withdrawing air from the filler to shrink it while mounted on a support, applying a cover to the shrunken filler and its support, and withdrawing the assembled cover and filler from the support.

A further object is to provide a method of applying a snug fitting cover to an expanded aerated filler, wherein the filler is mounted upon a support having suction means, is covered by an air impervious sheet preparatory to operation of the suction means to shrink the filler to a small size, a cover is applied around the filler and sheet, and the assembled filler, sheet and cover are removed from the support as a unit.

A further object is to provide an apparatus for use in applying a snug fitting cover to an expanded aerated filler, which apparatus is characterized by a filler support which has a plurality of spaced passages open at its supporting surface and connected with a source of suction to withdraw air from the filler while covered by a gas impervious sheet so as to shrink the filler while supported in a position convenient for application of the cover around the filler, sheet and support.

Other objects will be apparent from the following specification.

DESCRIPTION OF THE PREFERRED EMBODIMENT

Figure 1:
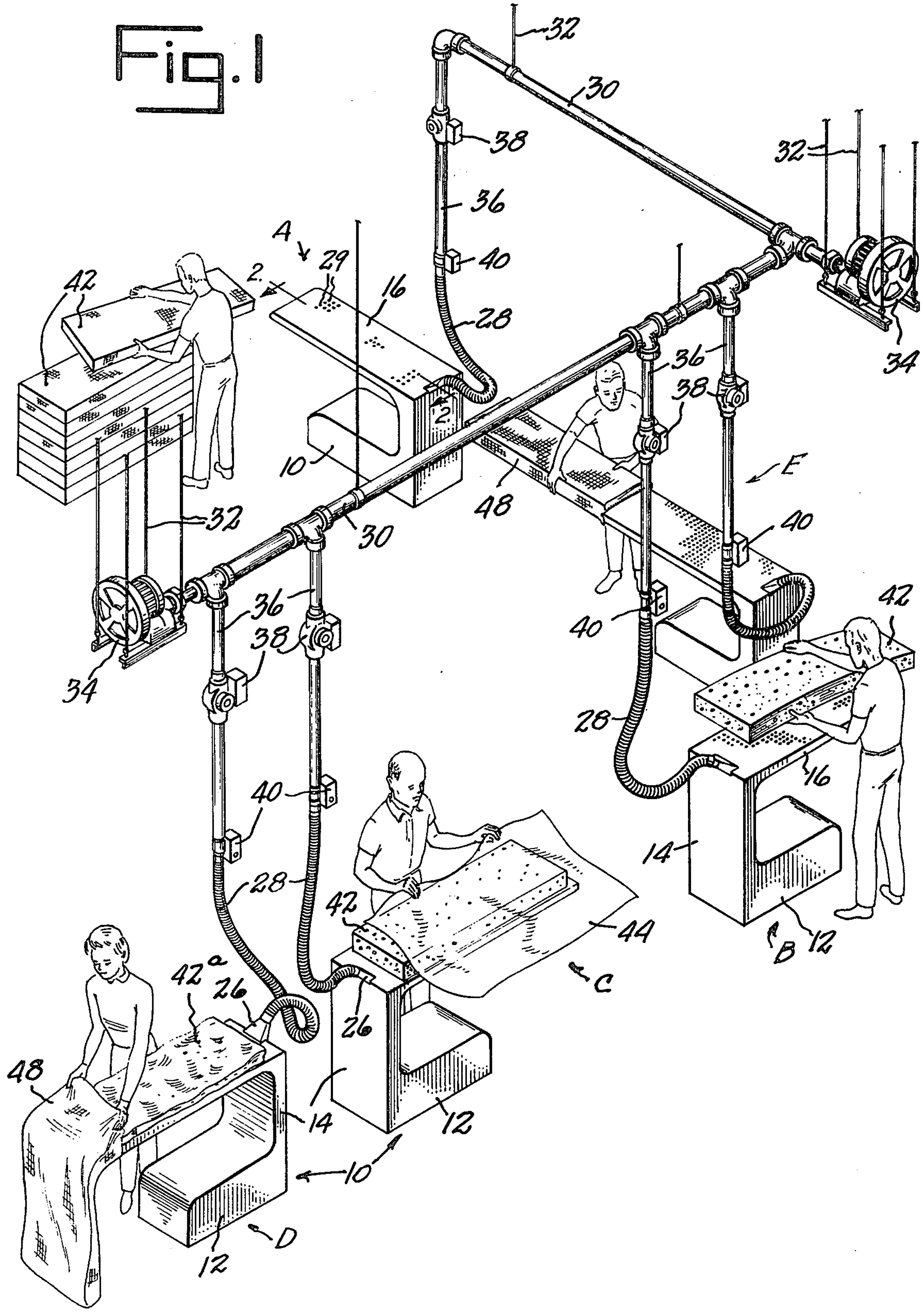
FIG. 1 is a perspective view illustrating various steps in my new method and the apparatus used therein.

The present method entails the steps of mounting an expanded aerated flexible filler upon a support having plural openings connected with a source of suction, placing an air impervious sheet over the filler material, activating the suction means to deaerate the filler and shrink it to a small size which accommodates easy and rapid application of a cover thereover while the filler is shrunk, and withdrawing the cover with its contained sheet and filler material from the support.

Referring to the drawings which illustrate one embodiment of apparatus for practice of the method and illustrate the steps of the method, the numeral 10 designates apparatus used in the practice of the method and characterized by a base 12, an upright or standard 14 preferably located at or adjacent one end of the base, and a substantially horizontal cantilevered support member 16 of selected size or top surface area mounted by the upper end of the standard. The cantilevered part of support member 16 may be of a width which is preferably substantially equal to the width of the filler material to be supported thereby and of a length slightly greater than the length of the filler material. The support member 16 is preferably hollow, having a chamber defined by bottom wall 18, side walls 20, end walls 22, and a perforated top wall 24. The end wall of the support member adjacent the standard 14 is provided with a tubular neck or fitting 26 at which is connected a conduit 28 which preferably is flexible.

The conduit 28 is connected to a source of suction. As here illustrated, where a plurality of the devices are employed, each conduit 28 is connected with a manifold 30, here shown as positioned in elevated relation to the apparatus as supported by plural suspension members 32 secured to an overhead support, such as the ceiling of a building. The manifold 30 has connection with one or more power driven suction-inducing units 34, such as blowers or fans oriented to withdraw air from the manifold and lines connected therewith. In manifold units to which multiple apparatus are connected it is preferable that, during normal working periods, the suction units 34 should operate continuously so that a suction condition constantly occurs within the manifold. Adjacent each apparatus 10 a conduit 36 branches from the manifold 30 for connection with the conduit 28 of that apparatus. Each branch conduit 36 has interposed therein a valve 38 which is normally closed, such as a solenoid controlled valve. Each valve 38 functions in response to a manually operated switch and timer unit 40 positioned within convenient reach of the operator of the apparatus with which the branch conduit 36 and conduit 28 are connected. The switch 40 will be of any suitable type which functions to close an operating circuit for a selected limited period of time following each actuation thereof and then reopens automatically.

The use of the device in the practice of the method is illustrated in FIG. 1 wherein successive manipulations in the practice of the method are designated at portions marked A,B, C, D and E. For purposes of illustration, the steps pictured in FIG. 1 deal with the stuffing of flexible open cell foam members into snug fitting covers. The foam may be polyurethane or other polyesters, dacron, or any fiber-filled ester. It will be understood that the method is not limited to the use of such material, but is also applicable to the process of inserting within a cover any filler, such as a cushion filler containing feathers, down or kapok, or a soft stuffing for a toy or doll.

Figure 2:
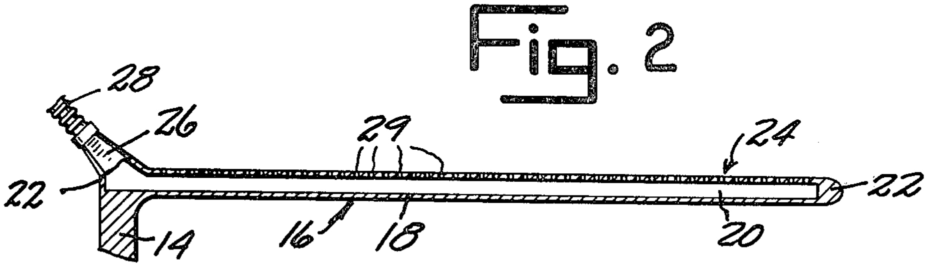
FIG. 2 is a fragmentary sectional view of the apparatus taken on line 2—2 of FIG. 1.

At positions A and B in FIG. 1, the apparatus is in the condition illustrated in FIG. 2 at which the associated solenoid valve 38 is closed so that the chamber of the cantilevered support 16 is open to atmosphere at the perforations 29 thereof. In the preferred form, the apertures 29 will preferably be spaced substantially uniformly, as at distances preferably three inches or less, and are located substantially throughout a selected portion of the top surface 24 of the member 16. It will be understood that the openings or apertures 29 may be open only at an area substantially equal to the area of the member 42, and that in cases where small articles are to be stuffed, an air impervious film or other means may be employed to close openings which are not covered by or adjacent to a filler 42 in the practice of the method.

Figure 3:
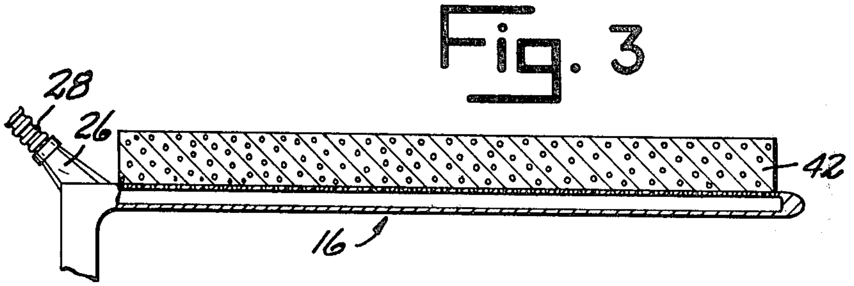
FIG. 3 is a fragmentary sectional view similar to FIG. 2 illustrating the mounting of an expanded cushion filler upon the support.

At position B in FIG. 1 is illustrated the placing of a filler member upon the cantilevered support 16 to a position as illustrated in FIG. 3 in which the member 42 covers all exposed apertures 29 of the apertured cantilevered member 16. This operation is preferably performed at a time when the solenoid valve 38 in the associated line 36 to the manifold 30 is closed, so that the member 16 and the chamber thereof is substantially at atmospheric pressure.

Figure 4:
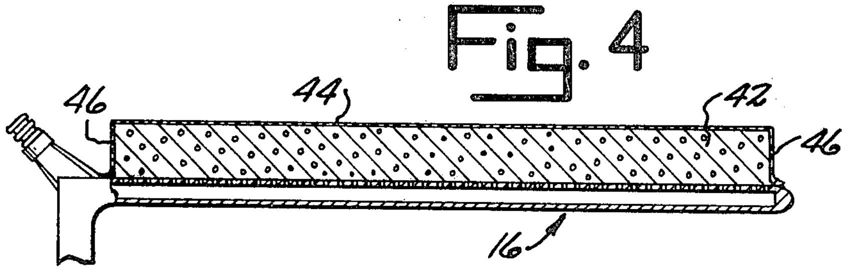
FIG. 4 is a view similar to FIG. 2 illustrating the application of an air impervious covering to a filler mounted on the support.

The next step of the method is illustrated at position C in FIG. 1, and at FIG. 4 and entails the placing of a sheet 44 of flexible air impervious material, such as a thin flexible plastic film, over the filler 42 mounted on the cantilevered support 16. The air impervious sheet 44 is of a size to completely cover the filler 42 and to be draped around the side and end edges of the filler 42, as seen at 46 in FIG. 4. This operation is also performed while the associated valve 38 is closed, so that the operation is performed while the chamber of support 16, the filler 42 and the sheet 44 are subject to atmospheric pressure.

Figure 5:
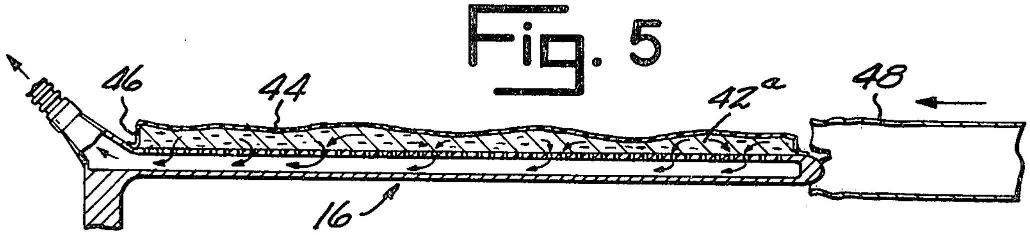
FIG. 5 is a view similar to FIG. 2 illustrating the shrinking of the filler to accommodate the application of a cover thereto.

The next step of the method is illustrated at position D in FIG. 1, and at FIG. 5. In this step the operator actuates the associated timer switch 40 to open the associated solenoid valve 38 for a selected period of time, preferably in the range of 10 seconds to 60 seconds, to evacuate air from the chamber of the support 16, and from the normally expanded filler 42 so as to shrink that filler and to draw the air impervious sheet 44 and the draped edges 46 thereof into firm sealing contact with the adjacent surfaces of the filler 42, as seen in FIG. 5. The evacuation of air from the filler shrinks it so as to facilitate the rapid and easy application of a cover 48 around the shrunken filler 42A, the air impervious sheet 44, and the support 16. As here illustrated, the cover 48 is flexible and is open only at one end thereof which may be provided with slide fasteners (not shown). It will be understood that the provision of an end open cover is optional, and that the cover may have a side opening instead of or in addition to an end opening. It will also be understood that the direction of application of the cover to the filler may be from the side of the filler instead of from the end thereof in cases where the support portion 16 is of a nature which permits side application of the cover instead of endwise application of the cover.

Figure 6:
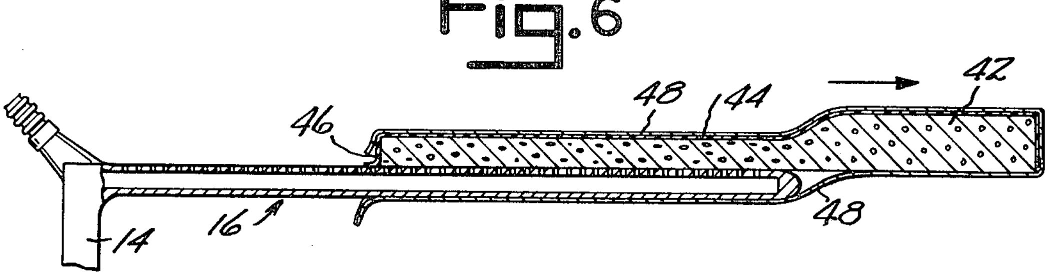
FIG. 6 is a view similar to FIG. 2 illustrating the withdrawal of an assembled filler and cover from the support after application of the cover to the filler.

The final step of the process is illustrated at position E in FIG. 1 and in FIG. 6. This step entails the withdrawal of the cover 48, the filler 42 and the sheet 44 as a unit from the support 16. This step is preferably performed while the associated valve 38 remains open so that the filler 42 will remain in its shrunken condition at least at the start of the withdrawal action, so as to facilitate such removal. By the time the fully encased filler is freed from the support, the filler will have expanded to completely fill the cover 48, and all that remains to complete a finished cushion will be the closing of the open end of the cover, as by means of a slide fastener (not shown). This may be done while the sheet 44 remains in cover 48, or after removal of sheet 44 from cover 48. It will be understood that the timer switch will be set to close at a selected time which may entail closing of the solenoid valve 38 at a time correlated with the time required for full application of the cover to the shrunken filler 42A and at least partial withdrawal of the cover, filler and sheet assembly from the support 16.

Thus it will be seen that the method entails the steps of placing an aerated expanded filler upon an apertured support, placing an air impervious flexible sheet over the filler while mounted upon the support so as to span the filler and drape the exposed side and end edges thereof, subjecting the filler to a suction condition imparted to the apertures of the support so as to deaerate and shrink the filler and draw the air impervious flexible sheet in close contact with the exposed surfaces of the filler, applying a cover around the shrunken filler and its cover sheet and the support for the filler so that the cover completely spans the upper exposed surfaces of the filler and its air impervious cover sheet, and then withdrawing the assembled cover, filler and sheet as a unit from the support.

It will be seen that the use of the flexible air impervious sheet covering the filler at the top, sides and ends thereof, coupled with the shrinking of the filler incident to deaeration thereof, accommodates easy, smooth application of a cover around the filler and minimizes the surface friction and resistance which occurs during normal manual application of a cover around an aerated expanded filler. The method is under the control of the operator with respect to the timing of the start of the air evacuating action upon the filler, and the air evacuation can be continued for a time as necessary for expeditious performance of the operations of applying the cover and removing the assembled cover and filler from the support. Where multiple units of apparatus are connected to a manifold as illustrated, each apparatus is under individual or separate control of the operator thereof through individual switches 40 and valves 38.

It has been found that the practice of the method to cover large cushions, such as those of six feet in length or longer, can be accomplished in from 50% to 60% of the time normally required for manual unaided application of a cover upon such a cushion, and the resulting cushion is of uniformly better quality than manually filled cushions with respect to the uniformity of the filler therein and the absence of creases and irregularities of the cover.

A further advantage is a reduction of worker fatigue as compared to the operation of manual unaided filling of the cushion. The fatigue incident to manual filling usually occurs progressively and rapidly reduces the speed of filling the cushion by hand during the course of a working day.

The vacuum employed may vary according to the nature of the cushion filler and the extent of shrinking of the filler desired. It has been found that a vacuum of 27 inches of Mercury will shrink a polyurethane cushion filler of dimensions of six feet in length by twelve inches in width and six inches in thickness as much as 90% from its normal expanded or aerated volume.

While the preferred embodiment of the apparatus and the practice of the method to fill one type of cushion have been illustrated and described, it will be understood that the invention contemplates other apparatus and variations of the method within the scope of the appended claims.

What I claim is:

1. Apparatus for use in the application around an air pervious expanded flexible filler of a flexible cover envelope open at a margin thereof and of a size and shape when closed which closely conforms to the normal expanded size and shape of the filler, in combination, a horizontal filler supporting member, means mounting said supporting member in cantilevered relation to accommodate application of said opened flexible cover envelope around the free end of the supporting member and articles supported thereon, means defining a plurality of air flow passages open in substantially uniformly spaced relation in at least a selected portion of the upper surface of said supporting member, a flexible substantially air impervious sheet draped over said filler supporting member and a filler supported thereon and spanning all air flow passages not spanned by said filler, and means located adjacent to said supporting means and connected to said passages to generate a sub atmospheric pressure in said passages and the space between said sheet and said supporting member and thereby collapse said filler and accommodate encirclement of said filler, sheet and the portion of said supporting member which supports said filler by said cover envelope when open.

2. Apparatus as defined in claim 1, wherein said support has a cavity with which said passages communicate and a tubular fitting located adjacent said support mounting means; and said subatmospheric pressure generating means includes a conduit connected at said fitting.

3. Apparatus as defined in claim 1, and manually operated means adjacent to said supporting member for controlling initiation of subatmospheric pressure in said passages.

4. Apparatus as defined in claim 1, wherein said subatmospheric pressure generating means includes a selectively manually operable switch, and means for timing the duration of subatmospheric pressure in said passages upon each manual actuation thereof.

5. Apparatus as defined in claim 1, wherein said subatmospheric pressure generating means includes a suction fan, conduit means connecting said fan with said air flow passages, and manually controlled valve means in said conduit means.

6. Apparatus as defined in claim 5, wherein said valve means constitutes a normally closed solenoid operated valve and a manual switch controlling said solenoid.

7. Apparatus as defined in claim 6, wherein said switch includes timing means for limiting the time during which said solenoid operated valve remains open following each activation of the switch.

8. Apparatus as defined in claim 1, wherein said subatmospheric pressure generating means includes a manifold, means creating a substantially constant subatmospheric condition in said manifold, conduit means connecting said manifold with said air flow passages, and normally closed manually operated valve means in said connecting conduit.

9. Apparatus as defined in claim 8, and means for reclosing said valve means after elapse of a selected period of time following each operation thereof to open said conduit.

* * * * *